United States Patent [19]

Reilly et al.

[11] Patent Number: 4,859,361
[45] Date of Patent: Aug. 22, 1989

[54] PROCESS FOR PRODUCING ELECTROLUMINESCENT PHOSPHORS OF IMPROVED BRIGHTNESS

[75] Inventors: Kenneth T. Reilly; Richard G. W. Gingerich, both of Towanda, Pa.

[73] Assignee: GTE Products Corporation, Stamford, Conn.

[21] Appl. No.: 297,209

[22] Filed: Jan. 17, 1989

Related U.S. Application Data

[63] Continuation-in-part of Ser. No. 194,646, May 13, 1988, abandoned.

[51] Int. Cl.$^4$ .............................................. C09K 11/56
[52] U.S. Cl. .............................................. 252/301.6 S
[58] Field of Search .................................. 252/301.6 S

[56] References Cited

U.S. PATENT DOCUMENTS

| | | | |
|---|---|---|---|
| 3,076,767 | 2/1963 | Faria et al. | 252/301.6 S |
| 3,082,344 | 3/1963 | Thornton | 252/301.6 S |
| 3,544,468 | 12/1970 | Catano | 252/301.6 S |
| 4,252,669 | 2/1981 | Kawai et al. | 252/301.6 S |

Primary Examiner—Jack Cooper
Attorney, Agent, or Firm—Ronald R. Castle; L. Rita Quatrini

[57] ABSTRACT

A process is disclosed for producing an electroluminescent phosphor which comprises blending a chloride flux, a copper source, and zinc sulfide to form a relatively uniform admixture, heating the admixture at a temperature of from about 1000° C. to about 1300° C. for about 2 to about 8 hours to convert at least a portion of the admixture to a crystalline material containing zinc sulfide, at least some chloride ions, and copper ions, washing the material with sufficient water to remove at least a major portion of the water soluble material from the crystalline material, drying the material to produce a relatively moisture-free material which is low intensity milled for a sufficient time to change the crystallographic structure of at least a portion of the moisture-free material, blending the milled material with zinc sulfate and copper sulfate, with or without manganese carbonate depending on whether manganese is desired as an activator, to form a second admixture, which is heated at a temperature of from about 750° C. to about 850° C. for about 1.5 to about 3 hours to form an activated material which is cooled for a period of time of from about 10 minutes to about 20 minutes followed by immediately quenching in water, removing the water from the cooled and quenched activated material, washing the material with reactive aqueous solutions to remove residual fluxes and excess activator materials, and drying the material to form an electroluminescent phosphor.

9 Claims, No Drawings

PROCESS FOR PRODUCING ELECTROLUMINESCENT PHOSPHORS OF IMPROVED BRIGHTNESS

This application is a continuation-in-part of application Ser. No. 194,646, filed May 13, 1988 now abandoned and assigned to the same assignee as the present application.

This invention relates to an improvement in a method for producing electroluminescent phosphors by a closer control of the cooling step and a more refined cooling technique. This improvement results in an increase in brightness of the phosphor.

BACKGROUND OF THE INVENTION

Electroluminescent phosphors are used for backlighting LCD's, in copying machines, for backlighting membrane switches, for automotive dashboard and control switch illumination, for automotive exterior body lighting, for aircraft style information panels, for aircraft formation lighting, and for emergency egress lighting.

U.S. Pat. No. 3,076,767 relates to a method for producing electroluminescent phosphors. The disadvantage of this method is that the resulting phosphor is not as bright as currently desired in the market place.

SUMMARY OF THE INVENTION

In accordance with one aspect of the invention, there is provided a process for producing an electroluminescent phosphor which comprises blending a chloride flux, a copper source, and zinc sulfide to form a relatively uniform admixture, heating the admixture at a temperature of from about 1000° C. to about 1300° C. for about 2 to about 8 hours to convert at least a portion of the admixture to a crystalline material containing zinc sulfide, at least some chloride ions, and copper ions, washing the material with sufficient water to remove at least a major portion of the water soluble material from the crystalline material, drying the material to provide a relatively moisture-free material which is low intensity milled for a sufficient time to change the crystallographic structure of at least a portion of the moisture-free material, blending the milled material with zinc sulfate and copper sulfate, with or without manganese carbonate depending on whether manganese is desired as an activator, to form a second admixture, which is heated at a temperature of from about 750° C. to about 850° C. for about 1.5 to about 3 hours to form an activated material which is cooled for a period of time of from about 10 minutes to about 20 minutes followed by immediately quenching in water, removing the water from the cooled and quenched activated material, washing the material with reactive aqueous solutions to remove residual fluxes and excess activator materials, and drying the material to form an electroluminescent phosphor.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention provides an improved process for producing an electroluminescent phosphor by which the brightness is increased. The invention is especially suited for copper activated zinc sulfide phosphors and copper and manganese activated zinc sulfide phosphors. The phosphors are green, blue, and yellow orange.

The method for producing the phosphor comprises heating zinc sulfide in a furnace to an elevated temperature in the presence of activators and halide fluxes to achieve an electroluminescent phosphor, cooling the phosphor to ambient temperature and washing the phosphor. The usual practice is to then allow the phosphor to cool to ambient temperature, that is for a length of time of cooling of from about 90 minutes to about 120 minutes before proceeding to the washing step. In the present invention, the phosphor is allowed to cool only slightly. The phosphor is removed from the furnace and allowed to stand at room temperature for a period of time of from about 10 minutes to about 20 minutes. The phosphor is then quickly quenched in water. The phosphor is then washed, dried and classified.

A detailed description of the process steps of the present invention is given below.

A relative uniform admixture is formed by blending a chloride flux, a copper source, and zinc sulfide. The copper source is typically copper sulfate. The chloride flux can be alkali metal chlorides, alkaline earth chlorides and mixtures thereof.

The admixture is then heated at a temperature of from about 1000° C. to about 1300° C. for a period of time of from about 2 hours to about 8 hours to convert at least a portion of the admixture to a crystalline material containing zinc sulfide, at least some chloride ions, and copper ions.

The resulting heated material is then washed with sufficient water to remove at least a major portion of the water soluble material from the crystalline material. Generally when the wash water has a conductivity of less than about 30 micromhos it indicates that essentially all of the water soluble material has been removed. It is preferred that deionized water be used as the wash water.

After the washing, the washed material is dried to produce a relatively moisture-free material.

The relatively moisture-free material is then subjected to low intensity milling for a sufficient time to change the crystallographic structure of at least a portion of this material from the hexagonal structure to the cubic structure.

This milled material is then blended with zinc sulfate and copper sulfate to form a second admixture if the phosphor is to be a copper activated phosphor. The milled material is blended with zinc sulfate, copper sulfate, and manganese carbonate if the phosphor is to be a copper and manganese activated phosphor.

This second admixture is then heated at a temperature of from about 750° C. to about 850° C. for about 1.5 hours to about 3 hours to from an activated material.

The resulting activated material is then cooled for a period of time of from about 10 minutes to about 20 minutes. Immediately after this relatively short cooling period, the material is then quenched in water. The quenching water is then removed from the quenched material.

The quenched material is then washed with reactive aqueous solutions to remove residual fluxes and excess activator materials. Preferred aqueous solutions include acetic acid, hydrochloric acid, and potassium cyanide aqueous solutions. Acetic acid is used to remove unreacted zinc materials from the activated material. Hydrochloric acid is used to remove unreacted manganese materials from the activated material. Potassium cyanide solution is used to remove excess copper materials.

The resulting washed activated material is then dried to form an electroluminescent phosphor.

If undesired particle size particles are formed, the particulate material is subjected to a particle size classification to remove undesirable size material and yield a material having a particle size of from about 15 to about 60 micrometers in diameter.

The brightness improvement gained by the improvement of this invention is from about 25% to about 30% over phosphors produced absent the present improvement of cooling for a limited period of time of about 10 to 20 minutes followed immediately by quenching in water.

The brightness improvement gained by this invention is shown in the following table.

TABLE

| # | Cooling Time (Minutes) * | Color X | Y | Initial Brightness at 400 HZ/115 V (Foot Lamberts) |
|---|---|---|---|---|
| yellow orange | | | | |
| 1 | 10 | 0.512 | 0.467 | 5.52 |
| 2 | 15 | 0.512 | 0.469 | 4.70 |
| 3 | 20 | 0.508 | 0.467 | 4.27 |
| 4 | 25 | 0.510 | 0.468 | 4.24 |
| 5 | 45 | 0.509 | 0.466 | 4.47 |
| 6 (prior process) | 90 | 0.518 | 0.471 | 4.31 |
| green | | | | |
| 7 | 10 | 0.215 | 0.505 | 31.7 |
| 8 (prior process) | 90 | 0.198 | 0.479 | 25.9 |
| 9 (prior) | 90 | 0.202 | 0.485 | 27.6 |

*Prior to quenching

As can be seen from the table, when the same types of phosphors are compared, the quicker the material is quenched after removal from the furnace, the higher the brightness. Cooling times of less than about 10 minutes result in a reaction (due to high temperature) between the phosphor and the water, and thus the cooling time is limited. It is not kowm for sure why quenching improves brightness of the phosphor. It can be theorized that since electroluminescent phosphor brightness is dependent on crystal structure and crystal defects, that quenching may have a positive effect on the crystal structure of the material.

To more fully illustrate this invention, the folowing nonlimiting examples are presented.

EXAMPLE 1

Copper sulfate is thoroughly mixed with zinc sulfide powder in an amount sufficient to establish a copper concentration of about 0.05% by weight based on zinc sulfide. A chloride flux is blended with the above mixture in an amount equal to about 8% by weight based on the zinc sulfide. The flux consists of 3% barium chloride, 3% magnesium chloride, and 2% sodium chloride, each percentage being by weight based on zinc sulfide. This admixture is then fired in a covered crucible in air to a temperature of about 1200° C. for about 5 hours and 15 minutes resulting in a well-crystallized starting material. The resulting crystallized material is next washed in water until excess halides are removed as determined by measuring the conductivity of the spent wash water. A conductivity of less than about 30 micromhos indicates that the excess materials are removed. The phosphor is then dried at a temperature of about 110° C. The dried material is then milled using low intensity milling for about 1.5 hours which is sufficient to change the crystallographic structure of at least some of the dried material. This essentially nonelectroluminescent phosphor material is next activated by about 4% manganese as manganese carbonate, 1% copper as copper sulfate, and 5.8% Zn as zinc sulfate with the phosphor and firing in a covered crucible in air to a temperature of about 800° C. for about 2 hours. Each percentage is by weight based on the phosphor material. After the firing period, the phosphor is cooled for from about 10 to about 20 minutes and quenched in water. The quenching water is removed and the quenched phosphor is washed with acetic acid/water (0.2/1 by volume), hydrochloric acid/water (0.3/1 by volume), and potassium cyanide/water (1 lb/2.5 gal). The phosphor is then dried at a temperature of about 110° C.

EXAMPLE 2

Copper sulfate is thoroughly mixed with zinc sulfide powder in an amount sufficient to establish a copper concentration of about 0.05% by weight based on zinc sulfide. A chloride flux is blended with the above mixture in an amount equal to about 8% by weight based on the zinc sulfide. The flux consists of 3% barium chloride, 3% magnesium chloride, and 2% sodium chloride, each percentage being by weight based on zinc sulfide. This admixture is then fired in a covered crucible in air to a temperature of about 1200° C. for about 5 hours and 15 minutes resulting in a well-crystallized starting material. The resulting crystallized material is next washed in water until excess halides are removed as determined by measuring the conductivity of the spent wash water. A conductivity of less than about 30 micromhos indicates that the excess materials are removed. The phosphor is then dried at a temperature of about 110° C. The dried material is then milled using low intensity milling for about 1.5 hours which is sufficient to change the crystallographic structure of at least some of the dried material. This essentially nonelectroluminescent phosphor material is next activated by about 1% copper as copper sulfate, and 5.8% Zn as zinc sulfate with the phosphor and firing in a covered crucible in air to a temperature of about 800° C. for about 2 hours. Each percentage is by weight based on the phosphor material. After the firing period, the phosphor is cooled for from about 10 to about 20 minutes and quenched in water. The quenching water is removed and the quenched phosphor is washed with acetic acid/water (0.2/1 by volume), and potassium cyanide/water (1 lb/2.5 gal). The phosphor is then dried at a temperature of about 110° C.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing an electroluminescent phosphor comprising:
    (a) blending a chloride flux, a copper source, and zinc sulfide to form a relatively uniform admixture;
    (b) heating the resulting admixture at a temperature of from about 1000° C. to about 1300° C. for about 2 to about 8 hours to convert at least a portion of the admixture to a crystalline material containing zinc sulfide, at least some chloride ions, and copper ions, (c) washing the resulting material with sufficient water to remove at least a major portion of the water soluble material from the crystalline material;

(d) drying the washed material to produce a relatively moisture-free material;

(e) subjecting said relatively moisture-free material to low intensity milling for a sufficient time to change the crystallographic structure of at least a portion of the moisture-free material from a hexagonal structure to a cubic structure;

(f) blending the resulting milled material with zinc sulfate and copper sulfate to form a second admixture;

(g) heating said second admixture at a temperature of from about 750° C. to about 850° C. for about 1.5 to about 3 hours to form an activated material;

(h) cooling said activated material by allowing it to stand at room temperature for a period of time of from about 10 minutes to about 20 minutes followed by immediately quenching said cooled material in water;

(i) removing said water from the resulting cooled and quenched activated material;

(j) washing said quenched activated material to remove residual fluxes and excess activator materials;

(k) drying the resulting washed material to form an electroluminescent phosphor.

2. A process of claim 1 wherein said quenched activated material is washed with acetic acid to remove unreacted zinc materials.

3. A process of claim 1 wherein said quenched activated material is washed with an aqueous solution of potassium cyanide to remove excess copper materials.

4. A process of claim 1 wherein the electroluminescent phosphor is classified to remove undesirable size material and to yield a material having a particle size of from about 15 to about 60 micrometers in diameter.

5. A process for producing an electroluminescent phosphor comprising:

(a) blending a chloride flux, a copper source, and zinc sulfide to form a relatively uniform admixture;

(b) heating the resulting admixture at a temperature of from about 1000° C. to about 1300° C. for about 2 to about 8 hours to convert at least a portion of the admixture to a crystalline material containing zinc sulfide, at least some chloride ions, and copper ions, (c) washing the resulting material with sufficient water to remove at least a major portion of the water soluble material from the crystalline material;

(d) drying the washed material to produce a relatively moisture-free material;

(e) subjecting said relatively moisture-free material to low intensity milling for a sufficient time to change the crystallographic structure of at least a portion of the moisture-free material from a hexagonal structure to a cubic structure;

(f) blending the resulting milled material with zinc sulfate, copper sulfate, and manganese carbonate to form a second admixture;

(g) heating said second admixture at a temperature of from about 750° C. to about 850° C. for about 1.5 to about 3 hours to form an activated material;

(h) cooling said activated material by allowing it to stand at room temperature for a period of time of from about 10 minutes to about 20 minutes followed by immediately quenching said cooled material in water;

(i) removing said water from the resulting cooled and quenched activated material;

(j) washing said quenched activated material to remove residual fluxes and excess activator materials;

(k) drying the resulting washed material to form an electroluminescent phosphor.

6. A process of claim 5 wherein said quenched activated material is washed with acetic acid to remove unreacted zinc materials.

7. A process of claim 5 wherein said quenched activated material is washed with an aqueous solution of potassium cyanide to remove excess copper materials.

8. A process of claim 5 wherein said quenched activated material is washed with hydrochloric acid to remove unreacted manganese materials.

9. A process of claim 5 wherein the electroluminescent phosphor is subjected to particle size classification to remove undesirable size material and to yield a material having a particle size of from about 15 to about 60 micrometers in diameter.

* * * * *